Nov. 15, 1927.  1,649,585

L. O. GRONDAHL

PHASEMETER

Filed Dec. 8, 1925    2 Sheets-Sheet 1

INVENTOR:
L. O. Grondahl,
BY
A. R. Verrill
ATTORNEY

Nov. 15, 1927.  1,649,585
L. O. GRONDAHL
PHASEMETER
Filed Dec. 8, 1925   2 Sheets-Sheet 2

INVENTOR
L. O. Grondahl,
BY A. L. Vencill
His ATTORNEY

Patented Nov. 15, 1927.

1,649,585

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

PHASEMETER.

Application filed December 8, 1925. Serial No. 74,081.

My invention relates to phasemeters, that is, meters for measuring the phase difference of two electromotive forces, two currents, or a voltage and a current.

Apparatus embodying my invention is particularly well adapted for use in connection with alternating current railway signaling of the type wherein a "track" circuit and a "local" circuit are used to supply currents to the two windings of a track relay. In systems of this character it is necessary to measure the phase difference between the currents in the two windings of the track relay.

The present case is a continuation in part of my co-pending application, Serial No. 590857, filed Sept. 27, 1922, for phasemeter.

I will describe several forms of phasemeters embodying my invention, and will then point out the novel features thereof in claims.

Figure 1:
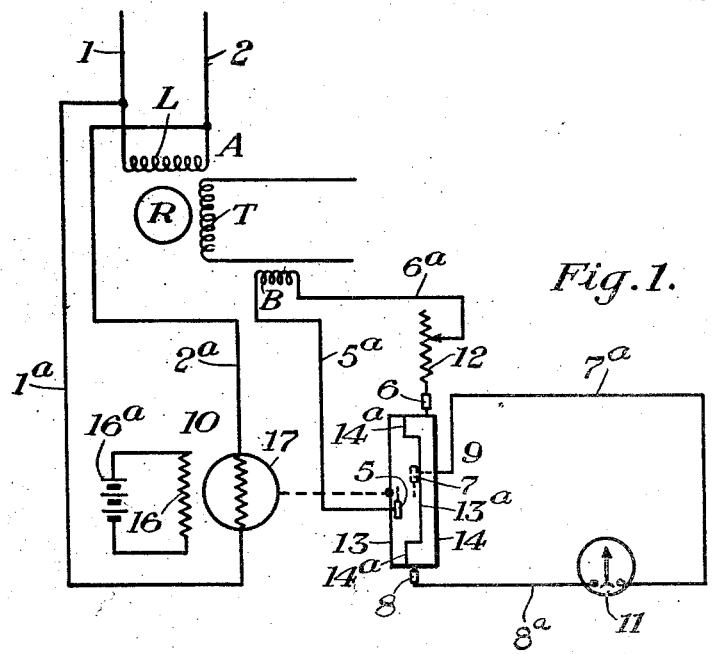
Figure 2:
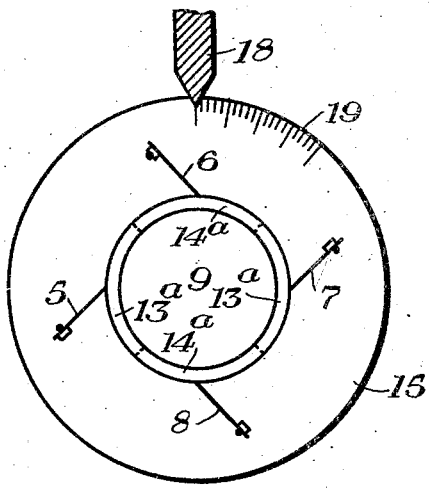
Figure 3:
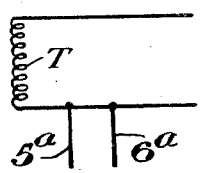
Figure 4:
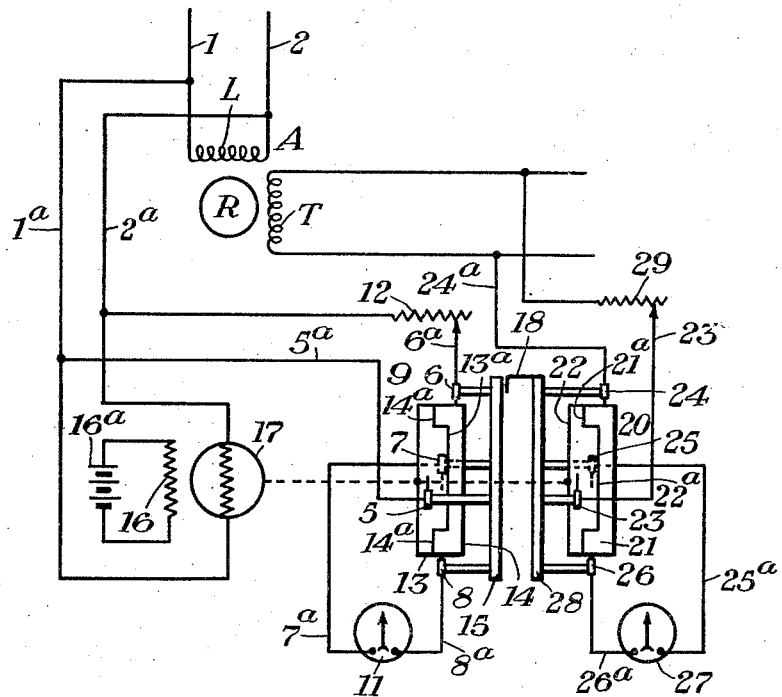
Figure 5:
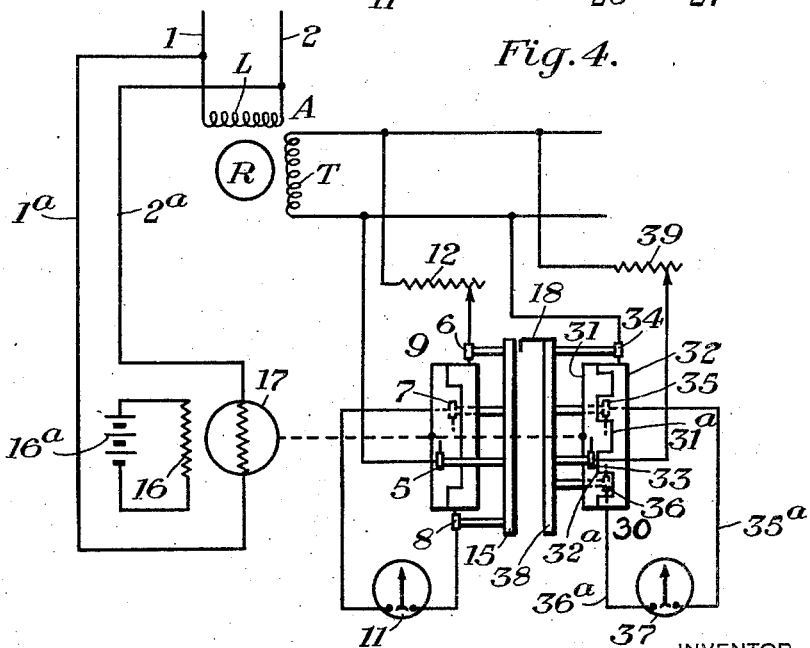

In the accompanying drawings, Fig. 1 is a diagrammatic view showing one form of phasemeter embodying my invention. Fig. 2 is an end view of the commutator structure of the phasemeter shown in Fig. 1. Fig. 3 is a diagrammatic view showing an alternative means for supplying current to the phasemeter. Figs. 4 and 5 are diagrammatic views showing modified forms of the phasemeter illustrated in Fig. 1 and also embodying my invention.

Similar reference characters refer to similar parts in each of the several views.

Referring first to Fig. 1, the reference character A designates a relay of the induction motor type comprising two stator windings L and T and a rotor R. The phasemeter comprises a synchronous motor 10 having a winding 16 supplied with direct current from some source of supply, such as a battery 16ª, and a rotor 17 supplied with alternating current from some suitable source, as the signal mains 1 and 2, by the wires 1ª and 2ª. This motor may be of any suitable form and is here assumed to be a four-pole motor. Rigidly fixed to the shaft of the said motor and rotating therewith is a crown commutator 9, that is, a commutator having two conducting segments 13 and 14, insulated from each other, and provided with teeth 13ª and 14ª, respectively, so formed or cut and so disposed on the periphery of the said commutator that a brush, bearing upon the central portion of the commutator as it is rotated, makes contact first with the one and then with the other of the two segments. These segments are so designed that the brush, in one complete rotation of the commutator, will pass from the one segment to the other as many times as there are poles in the synchronous motor.

Bearing on the surface of this commutator are two brushes 7 and 8 which bear upon the central portion of the commutator, and make contact with the teeth 13ª, 14ª. These brushes are spaced apart an angular distance equal to one tooth of the commutator, which in this case is equal to 90°. A galvanometer 11, preferably of the d'Arsonval type, is connected to these brushes by wires 7ª and 8ª. Two similar brushes 5 and 6 are connected by wires 5ª and 6ª with a coil B which may be placed in inductive relation to the circuits whose phase relations are to be measured. These brushes 5 and 6 may be mounted in any convenient location around the periphery of the commutator, care being taken to insure that one of these brushes 5 is so disposed as always to make contact with the segment 13, and the other brush 6, makes contact always with the other segment 14.

These four brushes 5, 6, 7, 8, are mounted on a suitable brush holder 15, which maintains their position with respect to each other, but permits of their rotation through 360° with respect to the poles of the synchronous motor 10.

The galvanometer 11, is protected by a series resistance 12, which may be varied with the voltage applied to the commutator.

A scale 19, in electrical degrees, is marked upon the structure 15 carrying the brushes, and a pointer 18 is fixed to the frame of the motor.

The procedure in using the phasemeter may be as follows.

I will assume that the two windings L and T of the relay A are supplied with alternating currents of the same frequency from sources not shown in the drawing, and that it is desirable to determine the phase relation of the currents in these two windings. To do this, the synchronous motor 10 is connected, as explained hereinbefore, with a source of alternating current and as here shown is connected with signal mains 1 and 2. The coil B is then placed in inductive relation with a portion of the circuit for winding T, and the structure 15 holding the brushes is shifted about its axis until the deflection of the galvanometer 11 is zero, showing that the commutator is commutating the wave train at the maximum value of the waves since the two halves of each rectified cycle then counter-balance each other in their effect upon the galvanometer, which condition exists only when rectification occurs at the peak of a symmetrical wave. The position of the scale 19 with respect to the pointer 18 is then noted. Since the commutator 14 is rigidly secured to the rotor of the motor 10, this first position marks a fixed point, namely, the wave peak, in the wave train of the current in winding T. The coil B is thereupon shifted to such position that it is in inductive relation to a portion of the circuit for the relay winding L, and the structure 15 is again shifted on its axis to such position that the deflection of the galvanometer is zero. This second position of the scale 19 with respect to the pointer 18 is noted and marks the position of the peak of the wave train of the current in winding L. Since both the first position and the second position locate corresponding points in the respective wave trains with respect to the rotating consequent poles of motor 10, which poles occupied the same relative position for both readings it follows that the angular difference between the two positions of the structure 15 will be a measure in electrical degrees of the phase relation of the currents in the two relay windings L and T.

If desired, the coil B may be eliminated, and the two wires 5ª and 6ª may first be connected with two points along one of the lead wires for winding T as shown in Fig. 3, and subsequently, connected in similar manner with one of the lead wires for winding L, thus obtaining small voltage drops which are in phase with the currents in the two relay windings.

It will, of course, be understood that the phase relations between the currents and voltages in any number of circuits may be measured in the same manner, and that the phasemeter is not in any way limited to use in connection with the two windings of a railway signaling relay.

One feature of the phasemeter shown in Figs. 1 and 2 is that no calibration is required.

Measurements of the phase relations of two quantities may be made with a single observation, using the modified form of phasemeter shown in Fig. 4. Referring to this drawing, the rotor 17 of synchronous motor 10 drives, in addition to the crown commutator 9, a second crown commutator designated in general by the reference character 20. This second commutator is similar to commutator 9 and comprises two insulated segments 21 and 22 having teeth 21ª and 22ª alternately disposed about the periphery of the commutator.

A brush holder 28 carries two brushes 23 and 24 which bear constantly on segments 21 and 22, respectively. Brushes 25 and 26, also carried by the brush holder 28, bear upon the central portion of the commutator and make contact with the teeth 21ª and 22ª. The two brushes 25 and 26 are so disposed that when one brush engages a tooth 21ª, the other brush engages a tooth 22ª. In the form here shown these brushes are spaced 90° apart. A galvanometer 27 is connected across brushes 25 and 26 by wires 25ª and 26ª.

The brush holder 15 is provided with a scale 19 marked in electrical degrees as in Figs. 1 and 2, and the pointer 18 is attached to brush holder 28 and co-operates with the scale.

The commutators 9 and 20 are connected with the sources of the electrical quantities which are to be compared. As shown in the drawing, brushes 5 and 6 of commutator 9 are connected, by means of wires 5ª and 6ª, with wires 1ª and 2ª. The electromotive force applied to winding L of relay A is therefore applied to these brushes. Brushes 23 and 24 of commutator 20 are connected across winding T of relay A by means of wires 23ª and 24ª. The limiting resistances 12 and 29 prevent the flow of excessive current through the commutators.

In operation, the commutators are adjusted so that when the wave trains supplied thereto are in phase, and when both galvanometers 11 and 27 have zero deflection, the pointer 18 will be opposite zero on the scale carried by brush holder 15.

When two quantities which differ in phase are supplied to the commutators then, their phase relation may be measured as follows:

Brush holder 15 is moved to such position that the deflection of galvanometer 11 is zero, showing that the wave train supplied to commutator 9 is being commutated at the maximum value of the waves. Brush holder 28 is then moved to such position that the deflection of galvanometer 27 is also zero. The commutation of the wave train supplied to commutator 20 is then occurring at the maximum value of the waves. The reading of scale 19 on brush holder 15, indicated by pointer 18 will then measure, directly in degrees, the phase relation of the electrical quantities supplied to the commutators.

Under some conditions it is desirable to measure the phase relation of electrical quantities of different frequencies, as between the fundamental and harmonic electromotive forces in a circuit such as the circuit for winding T. This may be accomplished by the phasemeter shown in Fig. 5.

In this modification the commutator 20 is replaced by a commutator 30 having two segments 31 and 32 provided with alternately disposed teeth 31ª and 32ª. The number of these teeth should be equal to a multiple of the teeth in commutator 9 corresponding to the harmonic which is to be studied. For example, in the drawing the parts are arranged to study the phase relation of a fundamental and its third harmonic and commutator 30 therefore has three times as many teeth as commutator 9. The pointer 18 is carried by a brush holder 38 carrying brushes 33, 34, 35 and 36. Brush 33 constantly bears on segment 31, and brush 34 on segment 32. Brushes 35 and 36 bear on the central part of the commutator and engage teeth 31ª and 32ª alternately. The brushes 35 and 36 are spaced apart as before by an angular distance equal to one tooth of the commutator, in this case 30°.

Brushes 35 and 36 are connected with a galvanometer 37, by means of wires 35ª and 36ª.

The commutators 9 and 30 are arranged so that when the fundamental and the harmonic supplied thereto are in phase, and galvanometers 11 and 37 have zero deflections, pointer 18 indicates zero on scale 19 of brush holder 15.

As illustrated in the drawing, the apparatus is arranged to study the phase relations between the fundamental electromotive force and the third harmonic thereof in the circuit for winding T of relay A. Brushes 5 and 6 of commutator 9 are connected across winding T, and brushes 33 and 34 of commutator 30 are also connected across this winding. The maximum value of the fundamental wave train may be located by commutator 9, and the maximum value of the harmonic wave train by commutator 30. If, therefore, brush holders 15 and 38 are adjusted so that the galvanometers 11 and 37 have zero deflection, the reading on scale 19 of brush holder 15, indicated by pointer 18, will be a measure of the phase difference between the fundamental electromotive force applied to winding T, and the third harmonic of this electromotive force.

Manifestly, the number of segments in commutator 30 may be altered to study any harmonic, the operation and principle of the apparatus remaining the same.

Similarly, the phasemeters shown in Figs. 4 and 5 may also be used to study the phase relation of two currents or of a current and an electromotive force as already described in connection with the form shown in Figs. 1 and 2.

Although I have herein shown and described only one form of apparatus embodying my invention, it is understood that various changes and modifications may be made therein within the scope of the appended claims without departing from the spirit and scope of my invention.

Having thus described my invention, what I claim is:

1. A phasemeter for measuring the phase relation of periodically varying electrical quantities, comprising a crown commutator, means for operating said commutator at a speed synchronous with at least one of said quantities, two brushes bearing on said commutators for supplying said quantities to the two segments of said commutator, two other brushes bearing on said commutator for receiving commutated current from said commutator, means connected with said last two brushes for detecting commutated current, a brush holder carrying said four brushes in fixed relation to each other but capable of motion as a unit with respect to said commutator, and means for measuring the angular position of said brush holder.

2. In combination, a source of electrical energy, a synchronous motor connected with said source, a crown commutator operated by said motor, a first brush bearing constantly on one segment of said commutator, a second brush bearing constantly on the other segment of said commutator, means for supplying a periodically varying electrical quantity to said first and second brushes, a third brush and a fourth brush spaced circumferentially on said commutator and making contact alternately with said segments, a galvanometer connected with said third and fourth brushes, a brush holder for supporting said four brushes in fixed relative positions but capable of rotation about said commutator and provided with a scale, and a pointer co-operating with said scale to indicate the angular position of the brush holder.

3. A phasemeter for measuring the phase relation of two periodically varying electrical quantities and comprising two crown commutators rotating in a constant phase relation to and in synchronism with at least one of said quantities, means for applying one of said quantities across the two segments of one of said commutators, a brush holder carrying two commutating brushes each alternately engaging the two segments of said one commutator, a first galvanometer connected with said commutating brushes, means for applying the other said quantity across the segments of the remaining commutator, a second brush holder carrying two commutating brushes each alternately engaging the two segments of such remaining commutator, a second galvanometer connected with the last-mentioned commutating brushes, and means carried by said second brush holder for co-operating with said first brush holder to measure the phase relation of said quantities.

4. A phasemeter comprising two crown commutators rotating synchronously, means for supplying two periodically varying electrical quantities to said commutators respectively, means for each commutator for locating corresponding points in the wave trains of said quantities, whereby the phase relation of said quantities is indicated by the relative positions of said last-mentioned means.

5. A phasemeter for measuring the phase relation of two periodically varying electrical quantities comprising two crown commutators rotating in a constant phase relation to and in synchronism with at least one of said quantities, means for supplying said quantities to said commutators respectively, two movable brush holders one for each said commutator and each carrying brushes bearing on the associated commutator, means for locating each said brush holder in a definite position corresponding to definite re-current points in the wave train of the quantity supplied to the associated commutator, and means for measuring the relative position of said brush holders.

6. A phasemeter for measuring the phase relation of two periodically varying electrical quantities of different frequencies, comprising two crown commutators rotating in a constant phase relation to and in synchronism with at least one of said quantities, the ratio of teeth on said commutators being equal to the ratio of frequencies of said quantities, means for supplying said quantities across the two segments of said commutators respectively, two movable brush holders, one for each said commutator and each carrying a pair of commutating brushes bearing upon the teeth of the associated commutator and spaced apart by a distance equal to one such tooth, a galvanometer connected with each pair of commutating brushes, and means for measuring the relative position of said brush holders.

In testimony whereof I affix my signature.

LARS O. GRONDAHL.